3,049,521
POLYMERIZATION OF VINYL CHLORIDE
Ward J. Burkholder, Houston, Tex., assignor to Diamond Alkali Company, Cleveland, Ohio, a corporation of Delaware
No Drawing. Filed Apr. 13, 1959, Ser. No. 805,676
5 Claims. (Cl. 260—87.1)

This invention relates to the use of ammonium bicarbonate as a buffer to maintain a desired alkaline pH in the polymerization of unsaturated polymerizable materials.

This is a continuation-in-part of my copending application, Ser. No. 525,356, filed July 29, 1955.

Of the four general types of polymerization processes, i.e., suspension, emulsion, solution, and bulk, both the emulsion and suspension types require certain conditions for the establishment of the desired emulsion and/or suspension. Of the two techniques, perhaps the characteristics of the suspension system and the conditions necessary to provide adequate dispersion without emulsification, are more critical. Up to the present time, typical suspension polymerization processes utilize, in addition to the monomers to be polymerized, a suspending agent and usually another additive such as a metallic buffer, e.g., lead acetate. In many instances, the polymerization products obtained by such techniques are entirely satisfactory. However, in most, if not all, of such processes, pH control is difficult and often critical to maintain the desired suspension characteristics.

Prior workers in the art have sought to overcome these difficulties by effecting a suspension at one pH generally above the iso-electric point of gelatin which is commonly employed as a suspending agent, and subsequently lowering the system pH to an acid value heretofore deemed more advantageous for polymerization. As pointed out above, frequently the polymerized products so obtained are satisfactory. However, one disadvantage of such products is their relatively poor color and electrical properties. Although many theories have been offered, perhaps the most plausible explanation of the prior disadvantageous electric properties has been that the difficulties are due to inclusion in the polymerized product of ionic materials unavoidably introduced when metallic buffers, such as sodium bicarbonate or lead acetate, are employed. Such ions tend to reduce the resistivity and impair other electrical properties.

Thus far, it will be appreciated that it has been difficult to control the pH of a polymerizing mass, and that the pH control agents heretofore employed have themselves introduced undesired characteristics in the final product, and/or generally provided a pH which is difficult to maintain without introduction of excessive amounts of pH control agent. A further difficulty has been that even the pH values so obtained are not in a desired pH range.

Hence, it is the primary object of this invention to avoid the difficulties heretofore encountered, and to provide a polymerization process wherein pH control is substantially automatic, this without impairing in any way the electrical, physical, and/or mechanical properties of the thus-formed polymerization product.

A further object of the invention is to provide a novel buffer which permits establishment and maintenance of an alkaline pH while eliminating undesirable residual ionic substances in the final product.

These and other objects and advantages of the invention will appear more fully from the following description thereof.

The present invention comprises the use of ammonium bicarbonate as a buffer to maintain an alkaline pH in an aqueous polymerization system, especially a suspension polymerization system. More particularly, the present invention contemplates the addition of ammonium bicarbonate to an aqueous polymerization system to maintain substantially the same pH throughout the polymerization process.

This invention does not contemplate the use of ammonium carbonate, carbon dioxide, ammonium hydroxide, and the like, even though these substances also are volatile and may well be completely removed from the polymer. On the contrary, this invention is specifically limited to and directed to the use of ammonium bicarbonate. The ammonium bicarbonate buffer offers advantages not characteristic of any of the other foregoing volatile substances. In the first place, it is a volatile buffer, unlike carbon dioxide and ammonium hydroxide which are not buffers in a true sense, but which may be used to exert an effect on pH. Moreover, the ammonium bicarbonate provides a singularly advantageous pH in the range of approximately 7.8 to 8.7 in water solution. Polymerization of various monomeric substances, notably vinyl chloride, at approximately this pH results in a substantially improved polymer both as to color and electrical properties without impairment of other characteristics. Contrariwise, carbon dioxide provides a relatively low, acid, pH. Ammonium hydroxide, on the other hand, yields a high pH, substantially removed from that obtained using ammonium bicarbonate.

Ammonium bicarbonate, unlike ammonium carbonate, produces a pH, e.g., 7.8 to 8.7, which even after long contact with solutions of such a pH, does not tend to cause attack upon glass-lined equipment as may be expected with the higher pH, e.g., 10.0, of an ammonium carbonate solution. Moreover, with ammonium carbonate or especially ammonium hydroxide the possibility of dehydrochlorination of halogen-containing monomers or polymers also must be considered. In addition, the presence of an acidic hydrogen is highly advantageous, i.e., it is capable of neutralizing alkalinity as well as acidity.

Ammonium bicarbonate is a volatile salt decomposing to form ammonia, carbon dioxide, and water upon heating within the range from 95° to 140° F. In water at 32° F., it is soluble to the extent of about 11.9 parts per 100 parts of water. Hence, small trace amounts not removed from the polymer during the washing operation would be substantially completely volatilized during drying, storage, and/or processing of the polymer thus handled, and a final product containing no residual ionic substance to impair its properties is obtained.

While the amount of ammonium bicarbonate to employ in a particular application is dictated by several factors, including the substances to be polymerized, the temperature, and/or other ingredients in the polymerizable mixture, as a general rule it is desirable to employ a small amount of ammonium bicarbonate in an amount sufficient to produce and maintain a pH from about 7.0 to 8.7 relative to the amount of monomers present. Typically practicable amounts range from 0.01 to .10% by weight of monomer or higher, e.g., up to about 0.5%. Superior results are obtained in many instances when the ammonium bicarbonate added comprises .02 to .04% by weight of the monomer added.

While the ammonium bicarbonate buffer of this invention may be advantageously employed in various polymerization substances, it is especially useful in suspension polymerization or copolymerization of vinyl chloride, vinyl acetate, vinylidene chloride, and esters of monomeric compounds which tend to hydrolyze under conditions which are too basic or too acidic. Generally, the type of polymerizable monomer which may be desirably polymerized in accordance with this information is a vinyl monomer which can be described as one having the characteristic structure:

$$>C=C<$$

Illustrative monomers are vinyl halides, including vinyl chloride, vinyl bromide, and the like, vinyl esters of carboxylic acid such as vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, orthochlorostyrene, p-chlorostyrene, 2,5-dichlorostyrene, 2,4-dichlorostyrene, ethylstyrene, divinyl benzene, vinylnaphthalene, β-methylstyrene; dienes such as butadiene, chloroprene; amides such as acrylacetamide, acrylacetanilide, nitriles such as acrylonitrile, esters of $\alpha,\beta$-carboxylic acids, for example, the methyl, ethyl, propyl, butyl, amyl, hexyl, heptyl, octyl, allyl, methyl-allyl and phenyl esters of maleic, crotonic, itaconic, fumaric acids and the like.

As indicated, a preferred monomer comprises a vinyl halide, especially vinyl chloride, the term "halide" being intended in a broad sense so as to include chlorides, bromides, iodides, and fluorides, although those skilled in the art will recognize, of course, that vinyl chloride is perhaps the most common vinyl halide monomer in use today.

Although the practice of the present invention permits the obtention of low molecular weight resins without copolymerization, copolymers can, of course, advantageously be prepared in accordance with this invention. For example, mixtures of vinyl monomers are contemplated such as copolymerizable mixtures of a vinyl halide and vinyl acetate such as vinyl chloride and vinyl acetate in varying proportions. In certain applications, it is preferred to employ a copolymerizable monomer mixture which contains a predominant amount of a vinyl halide, notably containing vinyl chloride in an amount of at least 75% by weight, preferably 85% or higher.

While the invention has been described with particular reference to homopolymers and copolymers of vinyl chloride and vinyl acetate, it will be understood, of course, that other monomers copolymerizable with vinyl chloride in accordance with this invention also may be used, e.g., vinylidene chloride; vinyl esters such as vinyl propionate, vinyl butyrate, vinyl-2-ethyl hexoate, vinyl octoate, vinyl stearate, vinyl benzoate; acrylic esters such as methyl acrylate, ethyl acrylate, butyl acrylate, 2-ethyl hexyl acrylate, cyclohexyl acrylate, and octyl acrylate; methacrylic esters such as methyl methacrylate, ethyl methacrylate, butyl methacrylate, 2-ethyl hexyl methacrylate, cyclohexyl methacrylate, and octyl methacrylate; esters of maleic and fumaric acid; and esters of itaconic acid.

Polymerization is generally aided by an elevated temperature typically within the range from 90° F. to 180° F. The polymerization time also varies, times from about 6 to 15 hours being typical. The water to monomer weight ratio can vary from about 1.5 to 5.0:1.0, typically about 1.5 to 2.5:1.

The suspending agent employed in the process of the present invention may comprise one or a mixture of various suspending agents. It generally is desirable to employ an amphoteric suspending agent, especially gelatin. The reference to gelatin denotes the several forms of bination with gelatin including various materials water hydrolyzed and the acid-hydrolyzed gelatin. Such reference also is not intended to exclude from the scope of this invention the use of other suspending agents in combination with gelating including various materials water soluble, cellulosic suspending agents or protective colloids such as methyl cellulose, methyl hydroxy isopropyl cellulose, carboxy methyl cellulose, etc., polyvinyl alcohols, sodium alginates, and the like.

The amount of gelatin to use will vary depending upon the specific application, the equipment used, and the suspension desired. However, in general it is desirable to use about 0.025% to 1.00% gelatin, based on the charged monomer.

Illustrative peroxide catalysts are benzoyl peroxide, lauryl peroxide, lauroyl peroxide, dicapryl peroxide, acetylbenzoyl peroxide, diacetyl peroxide, p-tertiary butyl perbenzoate, tertiary butyl perlaurate, ditertiary butyl peroxide; organic azo compounds such as the $\alpha,\alpha'$-azodiisobutyronitrile and dimethyl $\alpha,\alpha'$-azodiisobutyrate are suitable. Each catalyst will, of course, have an optimum concentration. However, the polymerization generally proceeds without difficulty or disadvantage in the presence of any of the well-known polymerization catalysts, especially peroxide catalysts, with concentrations of 0.05–0.40% by weight of the monomer. However, catalyst concentrations of about 0.15–0.30% are more suitable because of improved reaction rates, and generally about 0.20–0.25% catalyst by weight of monomer is preferred. Generally, the peroxide catalysts are preferred and lauroyl peroxide constitutes a suitable and especially effective specific catalyst.

In order that those skilled in the art may more completely understand the present invention and the preferred methods by which the same may be carried into effect, the following specific examples are offered:

Example I

To illustrate the effects obtained using ammonium bicarbonate as a buffer in a water-gelatin system, the following experimental procedure is carried out. A first solution comprising 529 ml. of water and 0.662 gm. of gelatin is prepared. A second solution similar in every respect except that it also contains 0.0906 gm. ammonium bicarbonate, also is prepared. Into each solution is introduced quantities of 0.0096 N HCl from a burette. The results of such experiments, indexed comparatively, are set forth below.

$NH_4HCO_3$ AS BUFFER

| Ml. HCl added: | pH |
|---|---|
| 0 | 7.5 |
| 10 | 7.3 |
| 20 | 7.0 |
| 30 | 7.0 |
| 40 | 6.9 |
| 50 | 6.8 |
| 60 | 6.6 |
| 70 | 6.8 |
| 80 | 6.2 |
| 90 | 6.0 |
| 100 | 5.8 |

NO BUFFER

| | |
|---|---|
| 0 | 7.5 |
| 10 | 5.6 |
| 13 | 5.4 |
| 14 | 5.3 |

As the foregoing data illustrates, the inclusion of even a minor amount of ammonium bicarbonate produces a substantially constant pH value over a wide range of additions of hydrochloric acid, thus simulating the formation of HCl as a by-product in the polymerization of vinyl halides. On the other hand, the unbuffered mixture rapidly attains a lower pH value as the hydrochloric acid is introduced.

Example II

To illustrate the preparation of polyvinyl chloride in a manner embodying the practice of this invention, to 287 gallons of water there is added 200 gms. of ammonium bicarbonate. This mixture is agitated for 15 minutes, and the temperature control adjusted to 116.6° F. There is then added, pre-dissolved in 6 gallons of water, 0.30% gelatin by weight of monomer. The gelatin-water mixture is washed in with 35 gallons of water and the resultant mixture is stirred for 30 minutes. To the thus-formed system there is added 165 gallons of vinyl chloride monomer with continuous agitation. When the temperature again reaches 116.6° F., 0.25% lauroyl peroxide (Alperox-C) based on the weight of the monomer, is washed in with 55 gallons of water.

The resultant suspension polymerization system is then maintained at 116.6° F. with continuous agitation for approximately 13 hours until a desired pressure drop in the vessel indicates that the desired degree of polymerization is obtained. During the polymerization cycle, the pH is controlled solely by the ammonium bicarbonate present and does not vary substantially from the original value of about 8.7 characteristic of a solution of ammonium bicarbonate. The resultant polymer is of generally excellent quality and has improved electrical properties and color.

*Example III*

To illustrate the improvement obtained by the practice of this invention experiments are conducted to compare the volume resistivities of polyvinyl chloride produced at an acid pH using phosphoric acid, and thus introducing ionic substances, with a polymer differing only in that no phosphoric acid is employed but in which polymerization is conducted at an alkaline pH maintained solely by ammonium bicarbonate.

Using such polymers, test specimens are prepared from a composition comprising 300 gms. of polymer and 150 gms. of dioctyl phthalate. These specimens comprise molded 4½″ diameter disks of 0.050″ to 0.060″ thickness. On each disk is painted a contact area defining for the particular thickness a one cubic centimeter volume using a silver paint. The specimens are then placed in an oven at 140° F. for 1½ hours. The thus-treated specimens are placed between two contact electrodes and a Megohm Bridge (Type 544–BAS4, General Radio Company), used to measure the volume resistivity.

| Formulation | Thickness (inches) | Reading Megohms | Volume Resistivity (ohm-cms.) |
|---|---|---|---|
| $H_3PO_4$—Polymer | 0.058 | $1.03 \times 10^2$ | $2.8 \times 10^{10}$ |
| $H_3PO_4$—Polymer | 0.052 | $1.18 \times 10^2$ | $3.6 \times 10^{10}$ |
| $NH_4HCO_3$—Polymer | 0.052 | $2.5 \times 10^2$ | $7.6 \times 10^{10}$ |
| $NH_4HCO_3$—Polymer | 0.051 | $2.5 \times 10^2$ | $7.7 \times 10^{10}$ |

As the foregoing data illustrates, the volume resistivities of specimens prepared in a phosphoric acid medium are far less than resistivities of specimens polymerized in an alkaline medium using ammonium bicarbonate as a buffer. In fact, the volume resistivity of the latter is numerically about twice as high as that of the former.

*Example IV*

To illustrate the production of a vinyl chloride-vinyl acetate copolymer in accordance with this invention, there are combined in a glass-lined reactor, provided with temperature control means and an agitator, 3,885 lbs. of vinyl chloride monomer, 9,250 lbs. of water and 780 lbs. of vinyl acetate monomer with 0.2% by weight of benzoyl peroxide, based on the weight of the monomers, and 0.2% by weight, based on the weight of the monomers, of alkali-hydrolyzed gelatin and 0.10% by weight of the monomers, of ammonium bicarbonate. The resultant mixture is suspension polymerized at a temperature of 167° F. for 12 to 15 hours, at which time a pressure drop of 0 to 5 p.s.i.g. from a pressure of about 165 p.s.i.g. is observed. The vinyl chloride-vinyl acetate copolymer, containing about 85% vinyl chloride and 15% vinyl acetate, is then recovered, washed with water and dried.

Summarizing the advantages of using ammonium bicarbonate as a buffer, it will now be understood that the polymerized product obtained contains substantially no ionic materials attributable to the buffer. Moreover, the polymer has excellent heat and light stability, color, and electrical properties. In addition, no toxicity is imparted by the buffer and the resin may be formulated with sulfur and/or sulfur-containing stabilizers without detrimental effect. As to the processability of the polymer, there is a substantial freedom from fisheyes, and the dry-blending and free-flowing characteristics are excellent.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of producing a high quality polymer which comprises mixing about 0.01 to 0.5% by weight of monomer of ammonium bicarbonate in water and dispersing in the resultant aqueous solution a polymerizable monomer selected from the group consisting of vinyl chloride and mixtures of vinyl chloride and vinyl acetate, using a suspending agent selected from the group consisting of gelatin and mixtures of gelatin, and at least one of methyl cellulose, methyl hydroxy isopropyl cellulose, carboxy methyl cellulose, polyvinyl alcohol, and sodium alginate, said suspending agent being present in an amount sufficient to impart to the aqueous reaction mixture the characteristics of a dispersion without emulsification, and suspension polymerizing the monomer while so suspended with the aid of a small amount of a peroxide polymerization catalyst at a temperature within the range of about 90° to 180° F.

2. The method according to claim 1 wherein the polymerizable monomer is vinyl chloride.

3. The method according to claim 1 wherein the polymerizable monomer is a mixture of vinyl chloride and vinyl acetate.

4. The method according to claim 3 wherein the mixture comprises at least 85% by weight of vinyl chloride.

5. The method according to claim 1 wherein the suspending agent is gelatin.

References Cited in the file of this patent

UNITED STATES PATENTS

| 2,559,749 | Benning | July 10, 1951 |
| 2,689,242 | Lucht | Sept. 14, 1954 |

FOREIGN PATENTS

| 1,018,504 | France | Jan. 8, 1953 |

UNITED STATES PATENT OFFICE
CERTIFICATE OF CORRECTION

Patent No. 3,049,521　　　　　　　　　　　　August 14, 1962

Ward J. Burkholder

It is hereby certified that error appears in the above numbered patent requiring correction and that the said Letters Patent should read as corrected below.

Column 3, line 60, for "bination with gelatin including various materials water" read -- gelatin, i.e., the so-called alkali-hydrolyzed, the water- --; line 64, for "gelating" read -- gelatin --.

Signed and sealed this 1st day of January 1963.

(SEAL)
Attest:

ERNEST W. SWIDER
Attesting Officer

DAVID L. LADD
Commissioner of Patents